United States Patent
Mori

(10) Patent No.: US 12,513,268 B2
(45) Date of Patent: Dec. 30, 2025

(54) PROJECTION METHOD AND PROJECTOR

(71) Applicant: SEIKO EPSON CORPORATION, Tokyo (JP)

(72) Inventor: Yuki Mori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 483 days.

(21) Appl. No.: 18/077,340

(22) Filed: Dec. 8, 2022

(65) Prior Publication Data

US 2023/0188689 A1 Jun. 15, 2023

(30) Foreign Application Priority Data

Dec. 9, 2021 (JP) ................................ 2021-199815

(51) Int. Cl.
*H04N 9/31* (2006.01)
*G03B 21/14* (2006.01)
*G06T 1/00* (2006.01)
*G06T 7/73* (2017.01)

(52) U.S. Cl.
CPC ......... *H04N 9/3194* (2013.01); *G06T 1/0007* (2013.01); *G06T 7/73* (2017.01); *H04N 9/3152* (2013.01); *H04N 9/3185* (2013.01)

(58) Field of Classification Search
CPC .... G03B 21/14; G03B 21/147; H04N 9/3185; H04N 9/3179
See application file for complete search history.

(56) References Cited

U.S. PATENT DOCUMENTS

| | | |
|---|---|---|
| 2008/0136976 A1 | 6/2008 | Ajito et al. |
| 2014/0268065 A1 | 9/2014 | Ishikawa et al. |
| 2014/0293243 A1* | 10/2014 | Furui ................... H04N 9/3185 353/121 |
| 2019/0028685 A1 | 1/2019 | Kaji et al. |
| 2019/0073753 A1 | 3/2019 | Yamauchi |
| 2020/0314400 A1 | 10/2020 | Sugiura |

FOREIGN PATENT DOCUMENTS

| | | |
|---|---|---|
| JP | 2005-257765 A | 9/2005 |
| JP | 2007-052471 A | 3/2007 |
| JP | 2012-008522 A | 1/2012 |
| JP | 2014-178393 A | 9/2014 |
| JP | 2019-047311 A | 3/2019 |
| JP | 2020-160352 A | 10/2020 |
| WO | WO 2006/025191 A | 3/2006 |
| WO | WO2017/154628 A | 9/2017 |

* cited by examiner

*Primary Examiner* — Ryan D Howard
(74) *Attorney, Agent, or Firm* — Dority & Manning, P.A.

(57) ABSTRACT

A projector projects a dot pattern onto a projection surface, the dot pattern containing a first dot, a second dot, a third dot, a fourth dot, and black dots. The first dot, the second dot, the third dot, the fourth dot, and the black dots are displayed in different modes. The first dot is adjacent to the second dot in the horizontal direction and also adjacent to the third dot in the vertical direction. The second dot is adjacent to the fourth dot in the vertical direction, and the third dot is adjacent to the fourth dot in the horizontal direction.

14 Claims, 15 Drawing Sheets

PROJECTION METHOD AND PROJECTOR

The present application is based on, and claims priority from JP Application Serial Number 2021-199815, filed Dec. 9, 2021, the disclosure of which is hereby incorporated by reference herein in its entirety.

BACKGROUND

1. Technical Field

The present disclosure relates to a projection method and a projector.

2. Related Art

There has been a known technology for correcting positional shift of an image displayed on a display surface.

For example, JP-A-2014-178393 discloses an image projection system in which as imaging apparatus captures an image of a plurality of dot patterns arranged in a two-dimensional array, the image projected on a projection receiving surface, and image data serving as a basis of an image projected by a projector is corrected based on the captured pattern.

There is, however, a desire to improve the detection accuracy of the dots contained in the projected dot pattern to accurately correct distortion of the projected image.

SUMMARY

A projection method according to an aspect of the present disclosure is a projection method including causing a projector to project a first image containing a dot pattern, acquiring a captured image as a result of capture of an image of the projected first image, and associating dots of the dot pattern contained in the captured image with dots of the dot pattern contained in the first image. The dot pattern contains a first dot, a second dot, a third dot, a fourth dot, and a fifth dot. A display mode of the first dot is a first display mode. A display mode of the second dot is a second display mode different from the first display mode. A display mode of the third dot is a third display mode different from the first and second display modes. A display mode of the fourth dot is a fourth display mode different from the first, second, and third display modes. A display mode of the fifth dot is a fifth display mode different from the first, second, third, and fourth display modes. The first dot is adjacent to the second dot in a first direction, and also adjacent to the third dot in a second direction perpendicular to the first direction. The second dot is adjacent to the fourth dot in the second direction. The third dot is adjacent to the fourth dot in the first direction.

A projector according to another aspect of the present disclosure is a projector including a projection unit that projects a first image containing a dot pattern, an imager that captures an image of the first image projected via the projection unit, and a controller that associates dots of the dot pattern contained in a captured image captured by the imager with dots of the dot pattern contained in the first image. The dot pattern contains a first dot, a second dot, a third dot, a fourth dot, and a fifth dot. A display mode of the first dot is a first display mode. A display mode of the second dot is a second display mode different from the first display mode. A display mode of the third dot is a third display mode different from the first and second display modes. A display, mode of the fourth dot is a fourth display mode different from the first, second, and third display modes. A display mode of the fifth dot is a fifth display mode different from the first, second, third, and fourth display modes. The first dot is adjacent to the second dot in a first direction, and also adjacent to the third dot in a second direction perpendicular to the first direction. The second dot is adjacent to the fourth dot in the second direction. The third dot is adjacent to the fourth dot in the first direction.

DESCRIPTION OF EXEMPLARY EMBODIMENTS

1. Configuration of Projector

Figure 1:
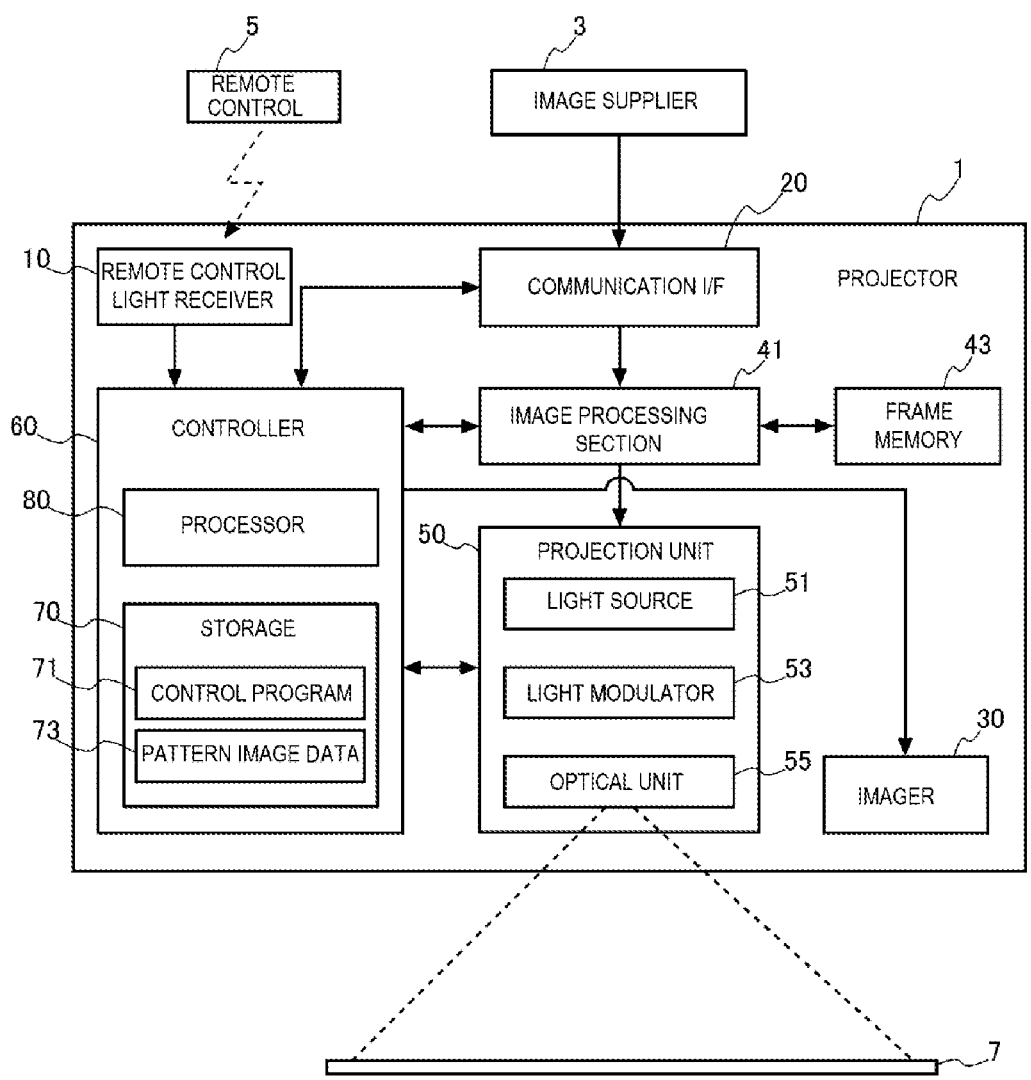
FIG. 1 is a block diagram showing the configuration of a projector.

FIG. 1 is a block diagram showing the configuration of a projector 1.

The projector 1 is an apparatus that generates image light based on image data supplied from an image supplier 3 or image data stored in a storage 70 of the projector 1, and displays the generated image light on a projection surface 7. The projection surface 7 may, for example, be a screen, a wall of a room, or a whiteboard. The image data supplied from the image supplier 3 or the image data stored in the storage 70 of the projector 1 is hereinafter referred to as display image data.

The projector 1 includes a remote control light receiver 10, a communication interface 20, an imager 30, an image processing section 41, a frame memory 43, a projection unit 50, and a controller 60. An interface is hereinafter abbreviated to an I/F.

The remote control light receiver 10 receives an infrared signal transmitted from a remote control 5. The remote control light receiver 10 decodes a received infrared signal to generate an operation signal corresponding to the received infrared signal. The thus generated operation signal is a signal corresponding to a button provided as part of the remote control 5 and operated by a user. The remote control light receiver 10 outputs the generated operation signal to the controller 60.

The communication I/F 20 is a communication device including an I/F circuit and is wired to the image supplier 3. The present embodiment will be described with reference to a case where the projector 1 and the image supplier 3 are wired to each other, and the projector 1 and the image supplier 3 may be wirelessly connected to each other. The communication I/F 20 outputs the display image data received from the image supplier 3 to the image processing section 41.

The imager 30 is a camera including an imaging lens, an imaging device, such as a CCD (charge coupled device) and a CMOS (complementary MOS) device, and a data processing circuit. The imaging optical system, the imaging device, and the data processing circuit are not shown. The imager 30 captures an image of a range containing at least the projection surface 7 to generate a captured image. The imager 30 outputs the generated captured image to the controller 60.

A frame memory 43 is coupled to the image processing section 41. The image processing section 41 writes the display image data inputted from the communication I/F 20 onto the frame memory 43 on a frame basis. The frame memory 43 includes a plurality of banks. The banks each have storage capacity that allows display image data corresponding to one frame to be written onto the bank. The frame memory 43 is formed, for example, of an SDRAM (synchronous dynamic random access memory).

The image processing section 41 performs image processing on the display image data developed in the frame memory 43, for example, resolution conversion or resizing, distortion correction, shape correction, digital zooming, and image color tone and brightness adjustment. The image processing section 41 performs image processing specified by the controller 60 and uses, as required, parameters inputted from the controller 60. The image processing section 41 can, of course, perform a plurality of types of the image processing described above in combination. The image processing section 41 reads the processed display image data from the frame memory 43 and outputs the read data to a light modulator 53.

The processing section 41 and the frame memory 43 are each formed, for example, of an integrated circuit. The integrated circuit includes an LSI, an ASIC (application specific integrated circuit), a PLD (programmable logic device), an FPGA (field-programmable gate array), an SoC (system-on-a-chip), and other devices. An analog circuit may form part of the configuration of each of the integrated circuits, or the controller 60 and the integrated circuits may be combined with each other.

The projection unit 50 includes a light source 51, the light modulator 53, and an optical unit 55.

The light source 51 is formed of a lamp, such as a halogen lamp, a xenon lamp, and an ultrahigh-pressure mercury lamp, or a solid-state light source, such as an LED and a laser light source.

The light modulator 53 includes light modulation devices. The light modulator 53 modulates the light outputted by the light source 51 based on the display image data to generate image light. The light modulation devices may each be a transmissive liquid crystal panel or a reflective liquid crystal panel. The light modulation devices may each be formed of a digital mirror device.

The optical unit 55 includes optical elements, such as a projection lens, enlarges the image light generated by the light modulator 53, and projects the enlarged image light toward the projection surface 7. An image based on the image light is thus displayed on the projection surface 7.

The controller 60 is a computer apparatus including the storage 70 and a processor 80.

The storage 70 includes a volatile memory, such as a RAM (random access memory), and a nonvolatile memory, such as a ROM (read only memory). The RAM is used to temporarily store a variety of data and other pieces of information, and the ROM stores a control program 71 used to control the action of the projector 1, pattern image data 73, which will be described later, and a variety of pieces of setting information.

The processor 80 is an arithmetic operation device formed of a CPU (central processing unit) or an MPU (microprocessing unit). The processor 80 executes the control program 71 to control each portion of the projector 1.

The controller 60 causes the image processing section 41 to process the display image data received by the communication I/F 20. In this process, the controller 60 specifies image processing to be performed by the image processing section 41 and outputs parameters used by the image processing section 41 to perform the processing to the image processing section 41. The controller 60 operates drivers that drive the light source 51 and light modulator 53 to drive the light source 51 and light modulator 53 to generate image light based on the display image data processed by the image processing section 41. The drivers are not shown in the figures.

When accepting operation of correcting positional shift of an image from the remote control 5, the controller 60 causes the image processing section 41 to process the pattern image data 73 and causes the projection unit 50 to display an image based on the pattern image data 73 having undergone the image processing on the projection surface 7. The image based on the pattern image data 73 is hereafter referred to as a pattern image 200a. The pattern image 200a corresponds to a first image.

The controller 60 causes the imager 30 to capture an image of the projection surface 7 on which the pattern image 200a is displayed and acquires the captured image. The controller 60 performs image analysis on the acquired captured image to detect detection dots 230, which will be described later, and generates correction data for the correction of the positional shift of an image based on the detected detection dots 230.

2. Configuration of Pattern Image

Figure 2:
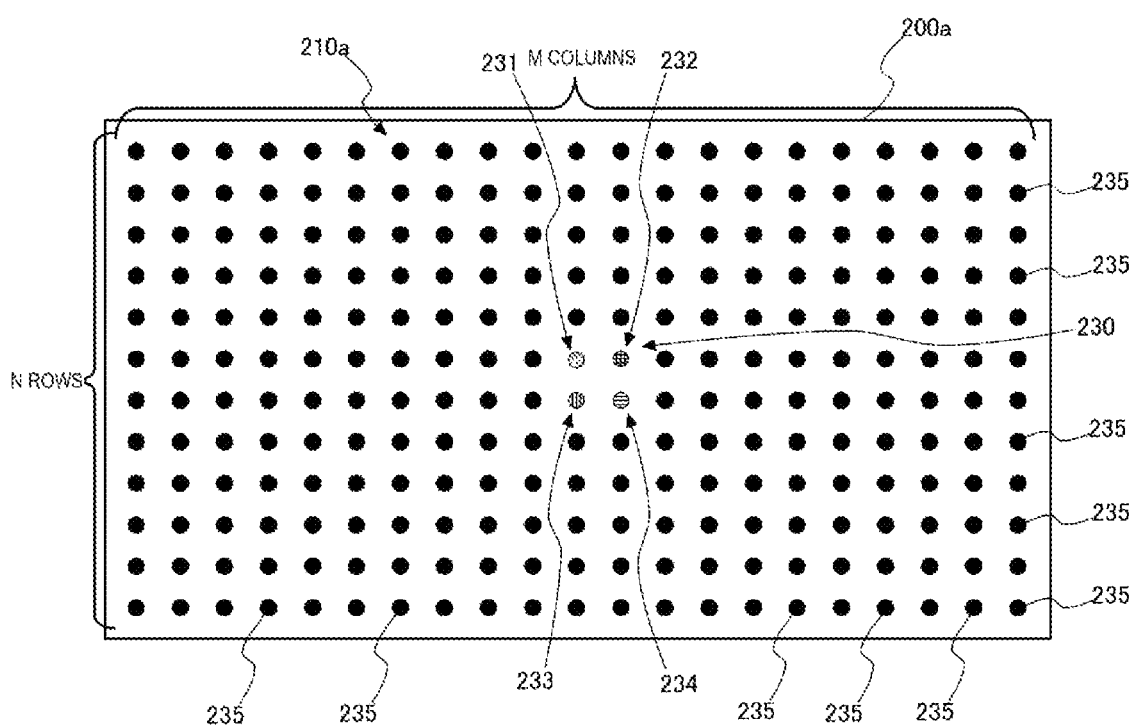
FIG. 2 shows an example of a pattern image.

FIG. 2 shows an example of the pattern image 200a.

The pattern image 200a will be described with reference to FIG. 2.

The pattern image 200a has a dot pattern 210a in which a plurality of dots are arranged in a matrix. The pattern image 200a shown in FIG. 2 has a dot pattern 210a having N vertically arranged rows and M horizontally arranged columns N and N are each an integer greater than or equal to three.

At a substantial center of the dot pattern 210a, four dots different from the other dots in terms of display mode are arranged in a matrix formed of two rows and two columns. The four dots are used for position detection, and the positions of the other dots are identified based on the positions of the four detected dots.

In the two-dimensional coordinate system showing positions in the pattern image 200a, when the origin is located at the upper left corner, two of the four dots are called as follows: the dot located at the upper left point is called a first dot 231; and the dot rightward adjacent to the first dot 231 is called a second dot 232. The dot downward adjacent to the first dot 231 is called a third dot 233. Furthermore, the dot downward adjacent to the second dot 232 is called a fourth dot 234. The first dot 231, the second dot 232, the third dot 233, and the fourth dot 234, when collectively referred to, are called detection dots 230 in the following sections.

In the dot pattern 210a formed in the pattern image 200a, dots other than the detection dots 230 are referred to as black dots 235. The black dots 235 correspond to a fifth dot and are drawn black.

In the present embodiment, the first dot 231 is drawn red, the second dot 232 is drawn blue, the third dot 233 is drawn green, and the fourth dot 234 is drawn white against a black background. The first dot 231, the second dot 232, the third dot 233, and the fourth dot 234 only need to be drawn in different colors other than black, which is the color of the black dots 235.

In the present embodiment, the first dot 231, the second dot 232, the third dot 233, the fourth dot 234, and the black dots 235 are dots having colors different from one another and therefore different from one another in terms of display mode, and the first dot 231, the second dot 232, the third dot 233, the fourth dot 234, and the black dots 235 may instead be dots having shapes different from one another.

The reason why the detection dots 230 are disposed substantially at the center of the dot pattern 210a will now be described.

For example, when the detection dots 230 are placed, for example, in an end portion of the pattern image 200a, and when the projector is not installed appropriately, for example, when the projector 1 does not squarely face the projection surface 7, all the detection dots 230 are not displayed on the projection surface 7 in some cases.

In contrast, the present embodiment, in which the detection dots 230 are placed substantially at the center of the pattern image 200a, can reduce the frequency of problems, such as an undetectable first dot 231, second dot 232, third dot 233, and fourth dot 234. In addition, based, for example, on the position of the center of gravity of the entire dots detected in the captured image, the area where the first dot 231, the second dot 232, the third dot 233, and the fourth dot 234 are located can be narrowed down.

When the projection surface on which the projector 1 projects the pattern image 200a, has protrusions and recesses, the closer a protrusion and a recess adjacent to each other are, the smaller the change in the difference between the protrusion and recess is. Arranging the first dot 231, the second dot 232, the third dot 233, and the fourth dot 234 in a matrix formed of two rows and two columns, in which the dots are adjacent to one another, therefore allows improvement in the accuracy, of the detection of the first dot 231, the second dot 232, the third dot 233, and the fourth dot 234.

The accuracy of the detection of the detection dots 230 can instead be improved by forming the first dot 231, the second dot 232, the third dot 233, and fourth dot 234 having colors different from one another and also from the color of the black dots 235.

Figure 3:
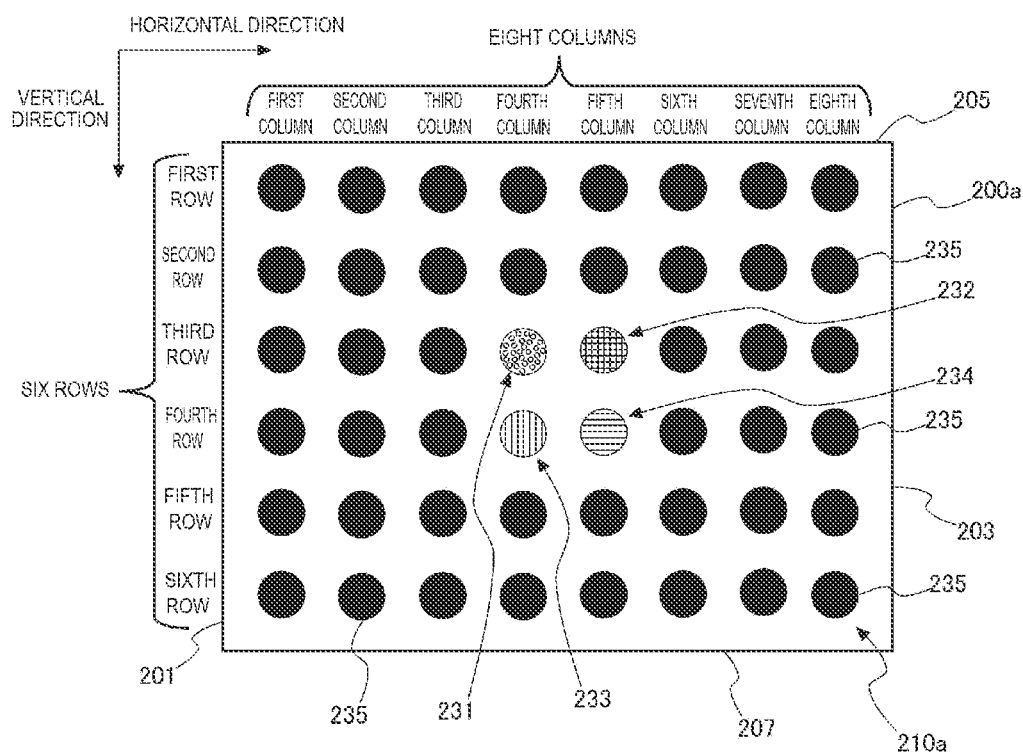
FIG. 3 shows a pattern image with the number of dots simplified.
Figure 4:
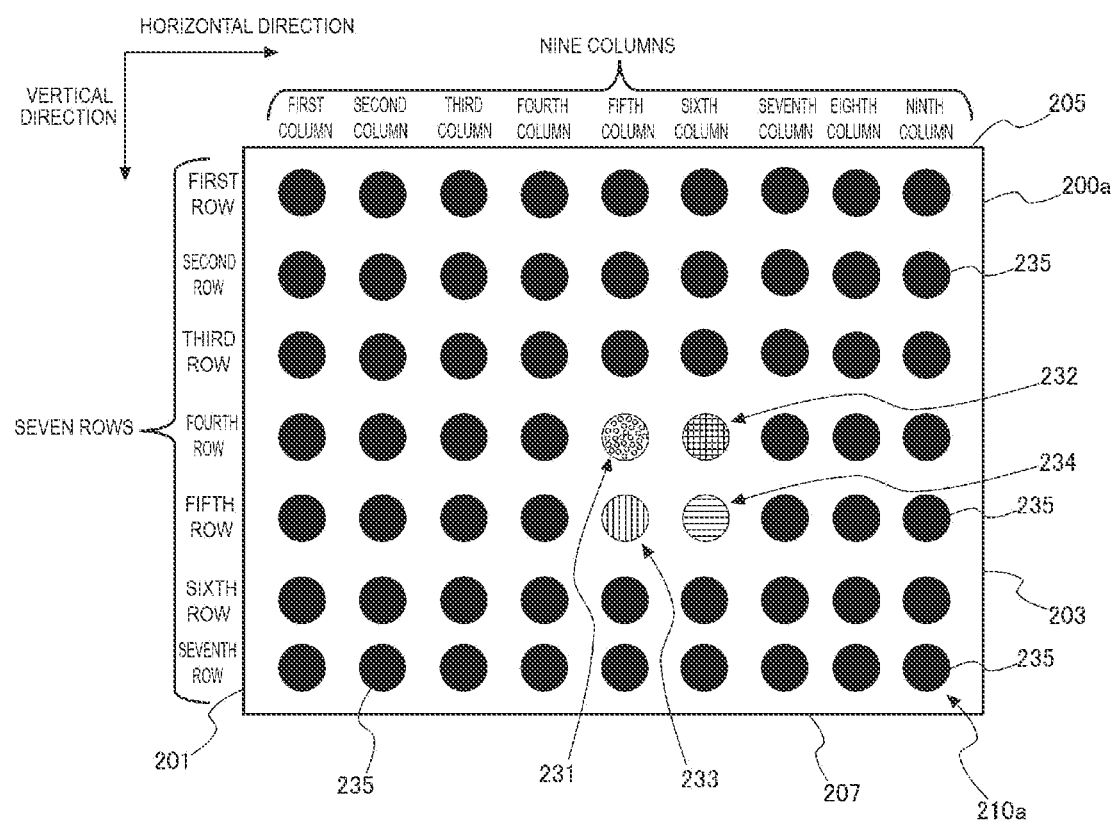
FIG. 4 shows another pattern image with the number of dots simplified.

FIGS. 3 and 4 each show a pattern image 200a with the number of dots simplified. In particular, FIG. 3 shows a case where the dot pattern 210a has N rows and M columns, where N and M are each an even number, and FIG. 4 shows a case where the dot pattern 210a has N rows and N columns, where N and N are each an odd number.

The positions of the first dot 231 to the fourth dot 234 in the pattern image 200a will be described with reference FIGS. 3 and 4. Since defining the position of the first dot 231 also naturally defines the positions of the second dot 232 to the fourth dot 234, only the position of the first dot 231 will be described in the following section.

FIG. 3 shows a case where "N", which is the number of rows, is six, which is an even number, and "M", which is the number of columns, is eight, which is an even number.

FIG. 4 shows a case where "N", which is the number of rows, is seven, which is an odd number, and "M", which is the number of columns, is nine, which is an odd number.

When N is an even number, the vertical position of the first dot 231 is the N/2-th position counted from the dot located at the upper vertical end. For example, in the case shown in FIG. 3, in which N is six, the first dot 231 is located in the third row. The vertical direction corresponds to a second direction.

When N is an odd number, the vertical position of the first dot 231 the (N+1)/2-th position counted from the dot located at the upper vertical end. For example, in the case shown in FIG. 4, in which N is seven, the first dot 231 is located in the fourth row. In the present example, the vertical position of the first dot 231 is the N/2-th or (N+1)/2-th position counted from the dot located at the upper vertical end, but not necessarily. For example, the vertical position of the first dot 231 may instead be the N/2-th or (N+1)/2-th position counted from the dot located at the lower vertical end.

When M is an even number, the horizontal position of the first dot 231 is the M/2-th position counted from the dot located at the left horizontal end. For example, in the case shown in FIG. 3, in which M is eight, the first dot 231 is located in the fourth column. The horizontal direction corresponds to a first direction.

When M is an odd number, the horizontal position of the first dot 231 is the (M+1)/2-th position counted from the dot located at the left horizontal end. For example, in the case shown in FIG. 3, in which N is nine, the first dot 231 is located in the fifth column. In the present example, the horizontal position of the first dot 231 is the M/2-th or (M+1)/2-th position counted from the dot located at the left horizontal end, but not necessarily. For example, the horizontal position of the first dot 231 may instead be the M/2-th Cr (M+1)/2-th position counted from the dot located at the right horizontal end.

Figure 5:
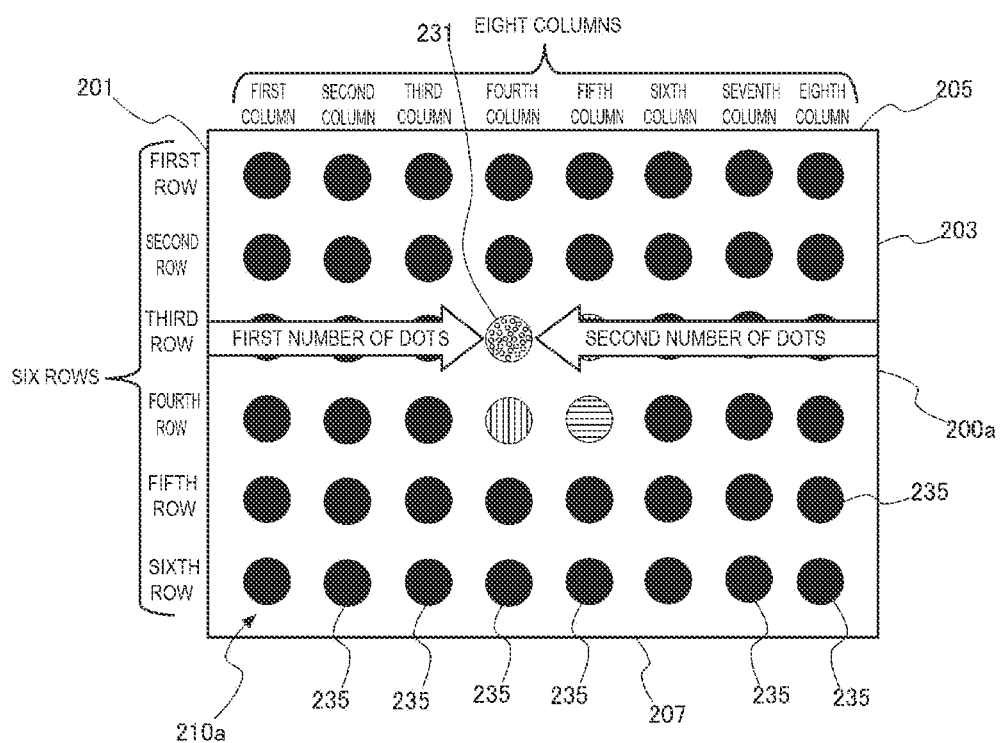
FIG. 5 shows the number of dots from a left side of the pattern image to a first dot and the number of dots from a right side of the pattern image to the first dot.

FIG. 5 shows the number of dots from a left side 201 of the pattern image 200a to the first dot 231 and the number of dots from a right side 203 of the pattern image 200a to the first dot 231 when the values of N and M are each an even number.

Figure 6:
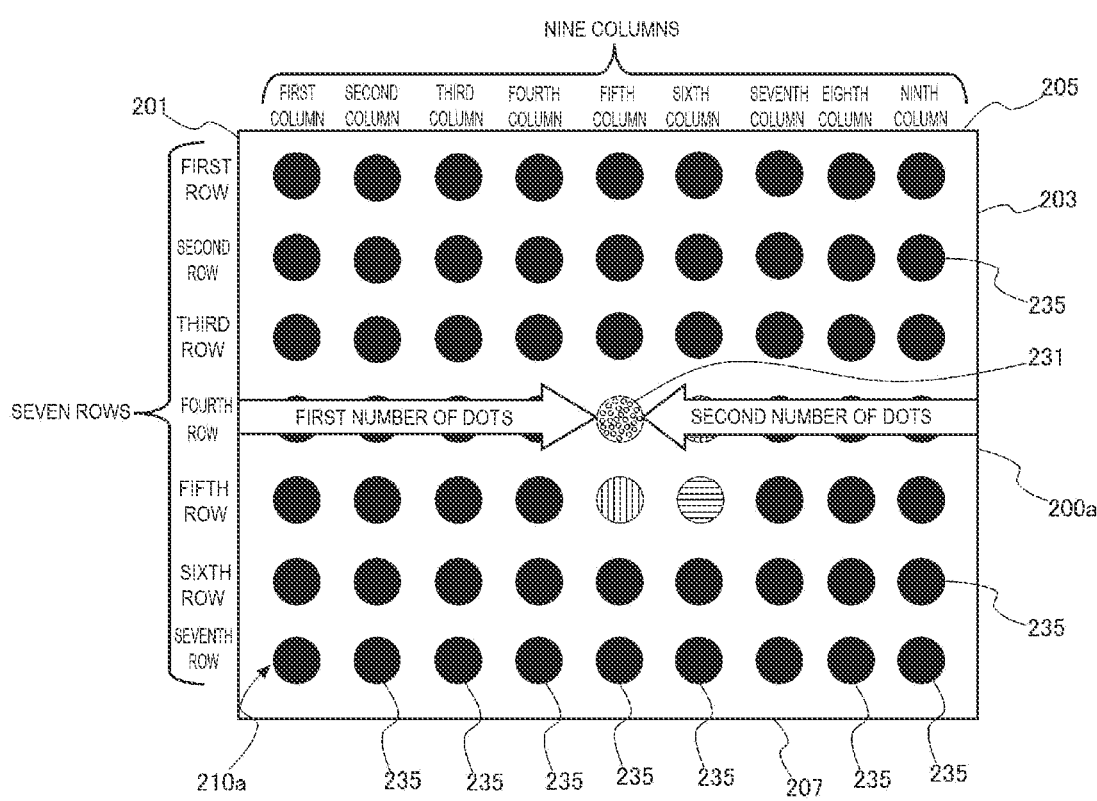
FIG. 6 shows the number of dots from the left side of the pattern image to the first dot and the number of dots from the right side of the pattern image to the first dot.

FIG. 6 shows the number of dots from the left side 201 of the pattern image 200a to the first dot 231 and the number of dots from, the right side 203 of the pattern image 200a to the first dot 231 when the values of N and M are each an odd number.

Figure 7:
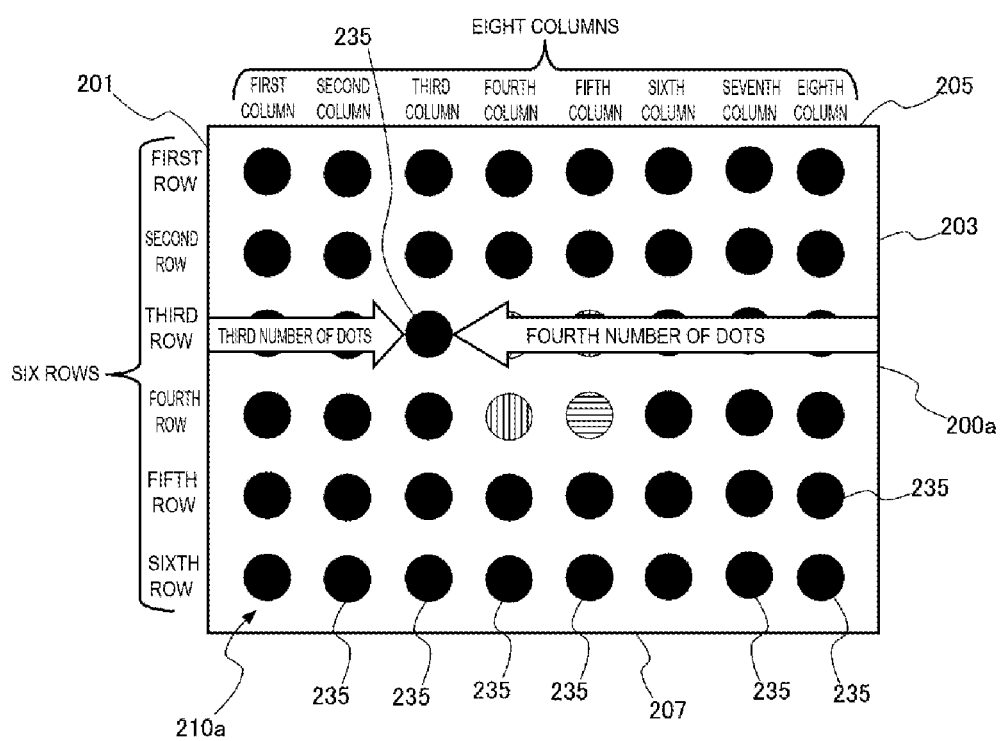
FIG. 7 shows the number of dots from a black dot located in the row where the first dot is located to the left side of the pattern image, and the number of dots from the black dot to the right side of the pattern image.

FIG. 7 shows the number of dots from a black dot 235 located in the row where the first dot 231 is located to the left side 201 of the pattern image 200a, and the number of dots from the black dot 235 to the right side 203 of the pattern image 200a when the values of N and N are each an even number.

Figure 8:
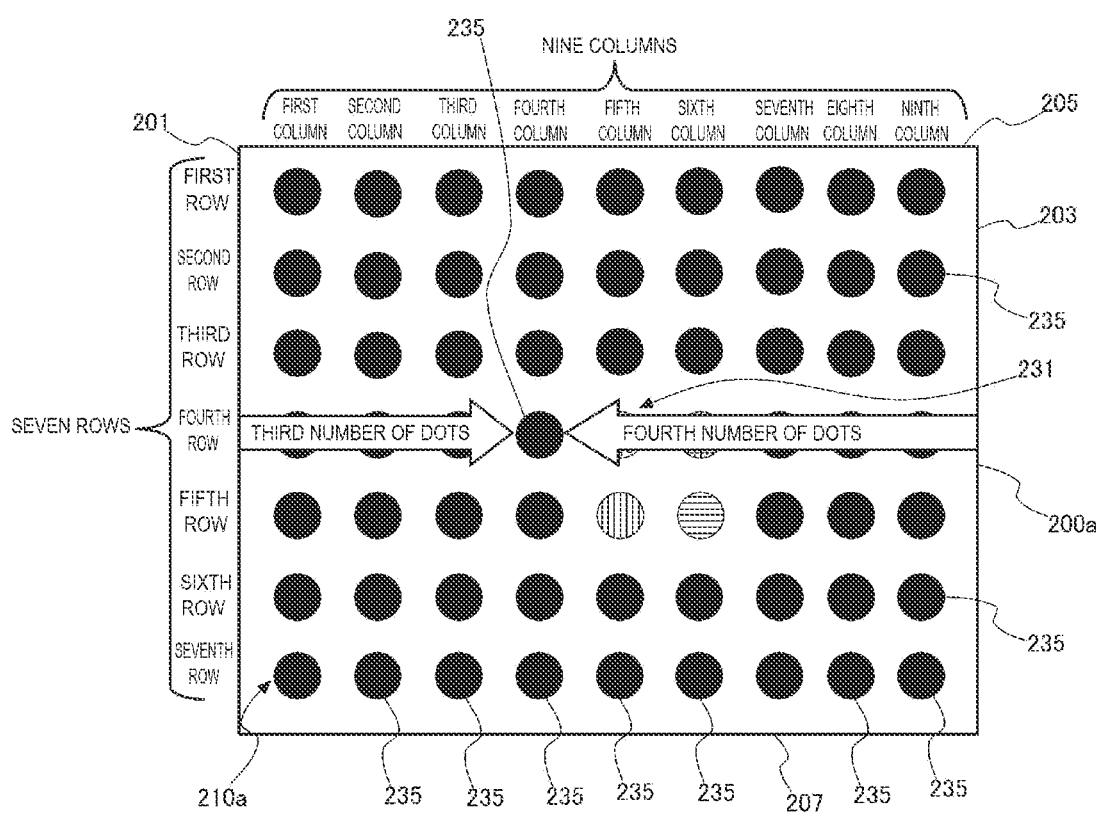
FIG. 8 shows the number of dots from a black dot located in the row where the first dot is located to the left side of the pattern image, and the number of dots from the black dot to the right side of the pattern image.

FIG. 8 shows the number of dots from a black dot 235 located in the row where the first dot 231 is located to the left side 201 of the pattern image 200a, and the number of dots from the black dot 235 to the right side 203 of the pattern image 200a when the values of N and M are each an odd number.

The number of dots placed from the left side 201 of the pattern image 200a to the first dot 231, and the number of dots placed from the right side 203 of the pattern image 200a to the first dot 231 will first be described with reference to FIGS. 5 and 6.

The number of dots from the left side 201 of the pattern image 200a to the first dot 231 is called a first number of dots, and the number of dots from the right side 203 of the pattern image 200a to the first dot 231 is called a second number of dots.

When the value of M is eight, which is an even number, the first number of dots is three and the second number of dots is four, as shown in FIG. 5.

When the value of M is nine, which is an odd number, the first number of dots is four and the second number of dots is also four, as shown in FIG. 6.

The difference between the first number of dots and the second number of dots is therefore "zero" or "one".

The number of dots placed from the left side 201 of the pattern image 200a to a black dot 235, and the number of dots placed from the right side 203 of the pattern image 200a to the black dot 235 will next be described with reference to FIGS. 7 and 8.

The black dot 235 is a black dot 235 placed in the row where the first dot 231 is placed.

FIG. 7 shows a case where the black dot 235 is the black dot 235 in the third row and the third column, which is the black dot 235 shifted by one column leftward from the first dot 231.

FIG. 8 shows a case where the black dot 235 is the black dot 235 in the fourth row and the fourth column, which is the black dot 235 shifted by one column leftward from the first dot 231.

The number of dots from the left side 201 of the pattern image 200a to the black dot 235 is called a third number of dots, and the number of dots from the right side 203 of the pattern image 200a to the black dot 235 is called a fourth number of dots.

When the value of M is eight, which is an even number, the third number of dots is two, and the fourth number of dots is five, as shown in FIG. 7.

When the value of N is nine, which is an odd number, the third number of dots is three, and the fourth number of dots is five, as shown in FIG. 8.

The difference between the third number of dots and the fourth number of dots is therefore "two" or "three". The difference between the first number of dots and the second number of dots is therefore smaller than the difference between the third number of dots and the fourth number of dots.

Figure 9:
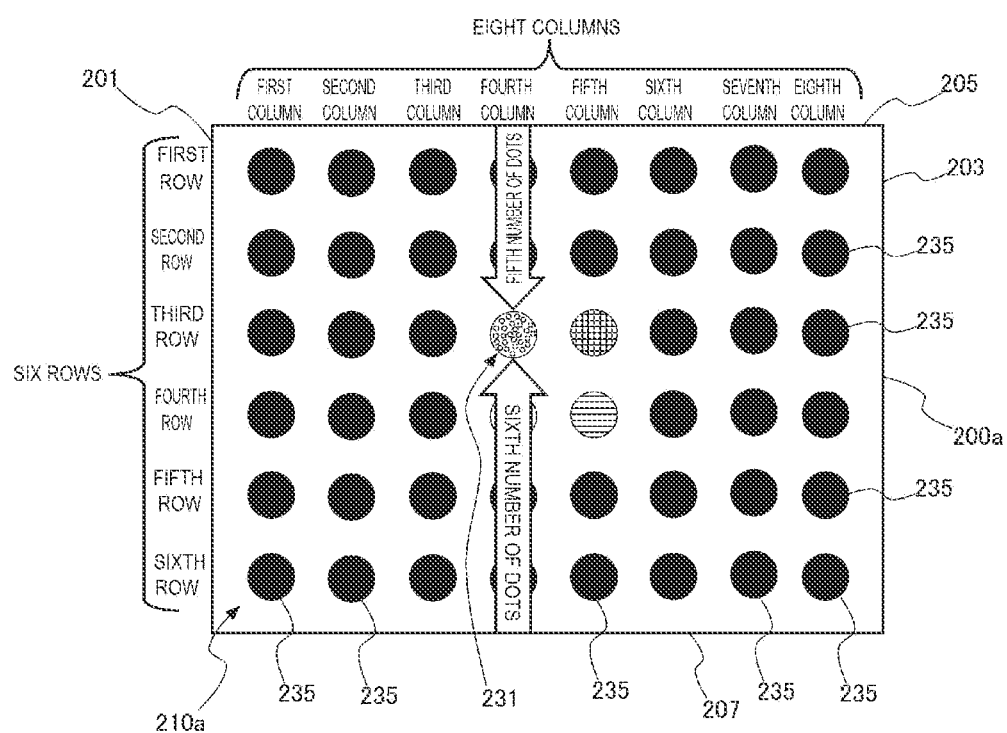
FIG. 9 shows the number of dots from an upper side of the pattern image to the first dot, and the number of dots from a lower side of the pattern image to the first dot.

FIG. 9 shows the number of dots from an upper side 205 of the pattern image 200a to the first dot 231, and the number of dots from a lower side 207 of the pattern image 200a to the first dot 231 when the values of N and M are each an even number.

Figure 10:
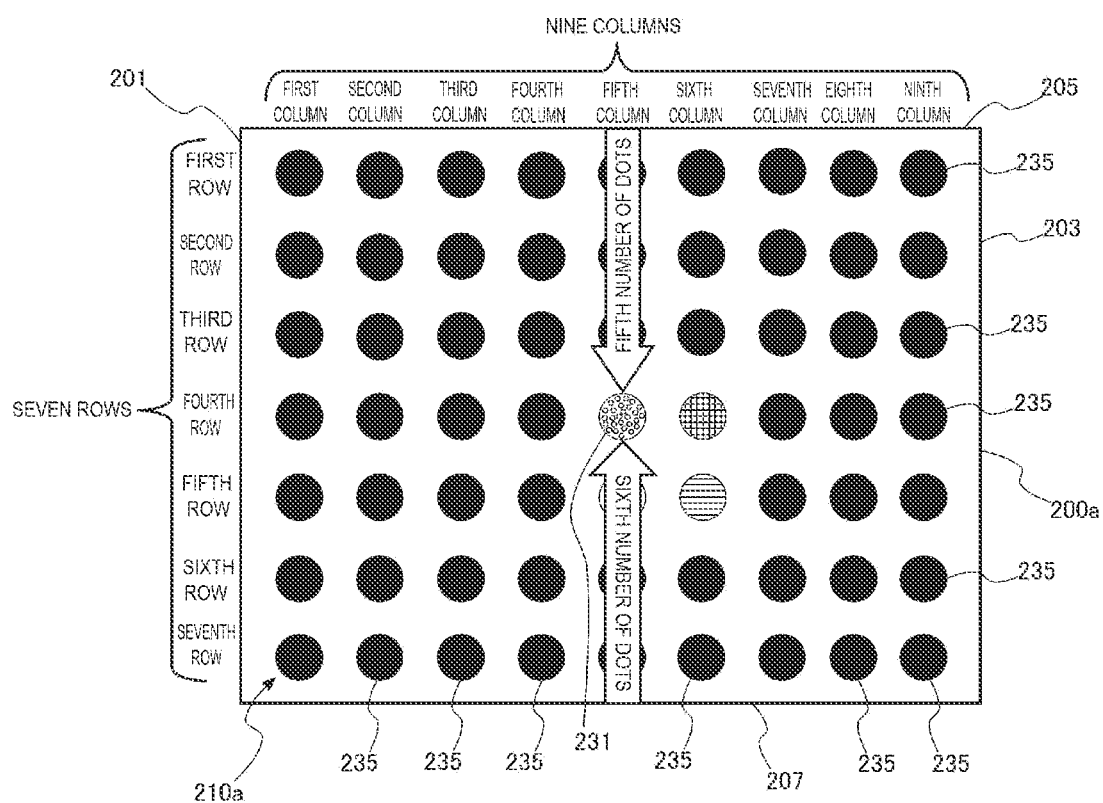
FIG. 10 shows the number of dots from the upper side of the pattern image to the first dot, and the number of dots from the lower side of the pattern image to the first dot.

FIG. 10 shows the number of dots from the upper side 205 of the pattern image 200a to the first dot 231, and the number of dots from the lower side 207 of the pattern image 200a to the first dot 231 when the values of N and M are each an odd number.

Figure 11:
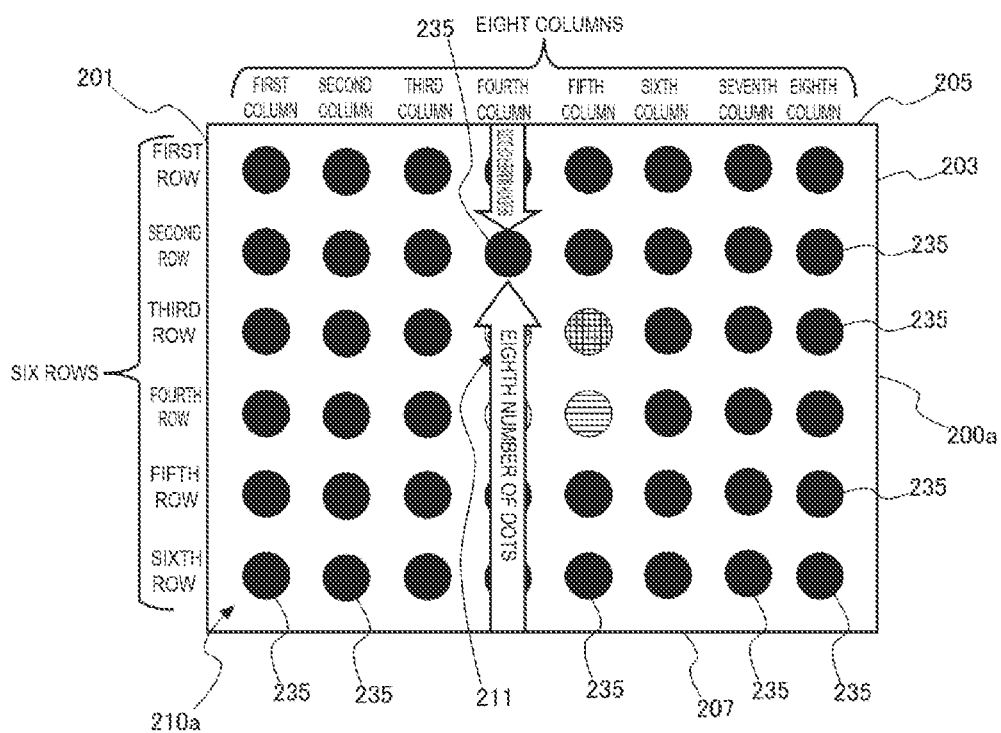
FIG. 11 shows the number of dots from a black dot located in the column where the first dot is located to the upper side of the pattern image, and the number of dots from the black dot to the lower side of the pattern image.

FIG. 11 shows the number of dots from a black dot 235 located in the row where the first dot 231 is located to the upper side 205 of the pattern image 200a, and the number of dots from the black dot 235 to the lower side 207 of the pattern image 200a when the values of N and M are each an even number.

Figure 12:
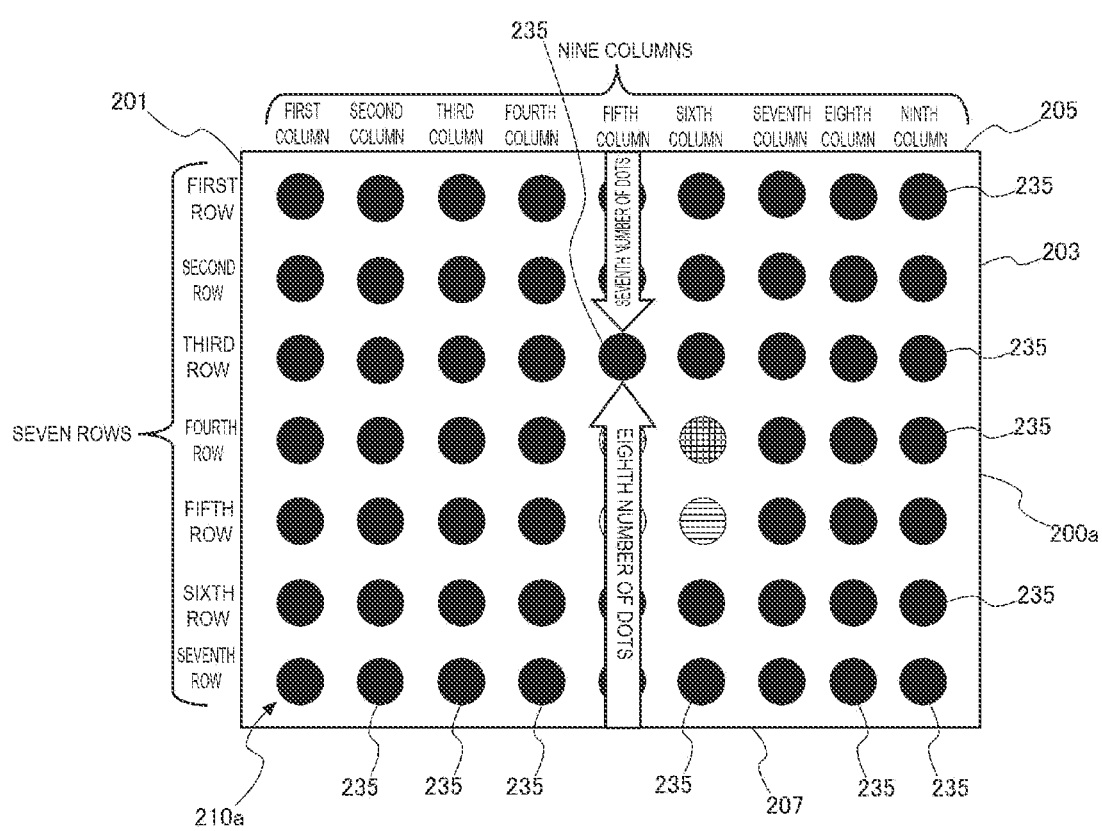
FIG. 12 shows the number of dots from a black dot located in the column where the first dot is located to the upper side of the pattern image, and the number of dots from the black dot to the lower side of the pattern image.

FIG. 12 shows the number of dots from a black dot 235 located in the row where the first dot 231 is located to the upper side 205 of the pattern image 200a, and the number of dots from the black dot 235 to the lower side 207 of the pattern image 200a when the values of N and M are each an odd number.

The number of dots placed from the upper side 205 of the pattern image 200a to the first dot 231, and the number of dots placed from the lower side 207 of the pattern image 200a to the first dot 231 will first be described with reference to FIGS. 9 and 10.

The number of dots from the upper side 205 of the pattern image 200a to the first dot 231 is called a fifth number of dots, and the number of dots from the lower side 207 of the pattern image 200a to the first dot 231 is called a sixth number of dots.

When the value of N is six, which is an even number, the fifth number of dots is two, and the sixth number of dots is three, as shown in FIG. 9.

When the value of N is seven, which is an odd number, the fifth number of dots is three, and the sixth number of dots is also three, as shown in FIG. 10.

The difference between the fifth number of dots and the sixth number of dots is therefore "zero" or "one".

The number of dots placed from the upper side 205 of the pattern image 200a to a black dot 235, and the number of dots placed from, the lower side 207 of the pattern image 200a to a black dot 235 will then be described with reference to FIGS. 11 and 12.

The black dot 235 is a black dot 235 placed in the column where the first dot 231 is placed.

FIG. 11 shows a case where the black dot 235 is the black dot 235 in the second row and the fourth column, which is the black dot 235 shifted by one row upward from the first dot 231.

FIG. 12 shows a case where the black dot 235 is the black dot 235 in the third row and the fifth column, which is the black dot 235 shifted by one row upward from the first dot 231.

The number of dots from the upper side 205 of the pattern image 200a to the black dot 235 is called a seventh number of dots, and the number of dots from the lower side 207 of the pattern image 200a to the black dot 235 is called an eighth number of dots.

When the value of N is six, which is an even number, the seventh number of dots one, and the eighth number of dots is four, as shown in FIG. 11.

When the value of M is seven, which is an odd number, the seventh number of dots is two, and the eighth number of dots is four, as shown in FIG. 12.

The difference between the seventh number of dots and the eighth number of dots is therefore "two" or "three". The difference between the fifth number of dots and the sixth number of dots is therefore smaller than the difference between the seventh number of dots and the eighth number of dots.

3. Variation of Pattern Image

Figure 13:
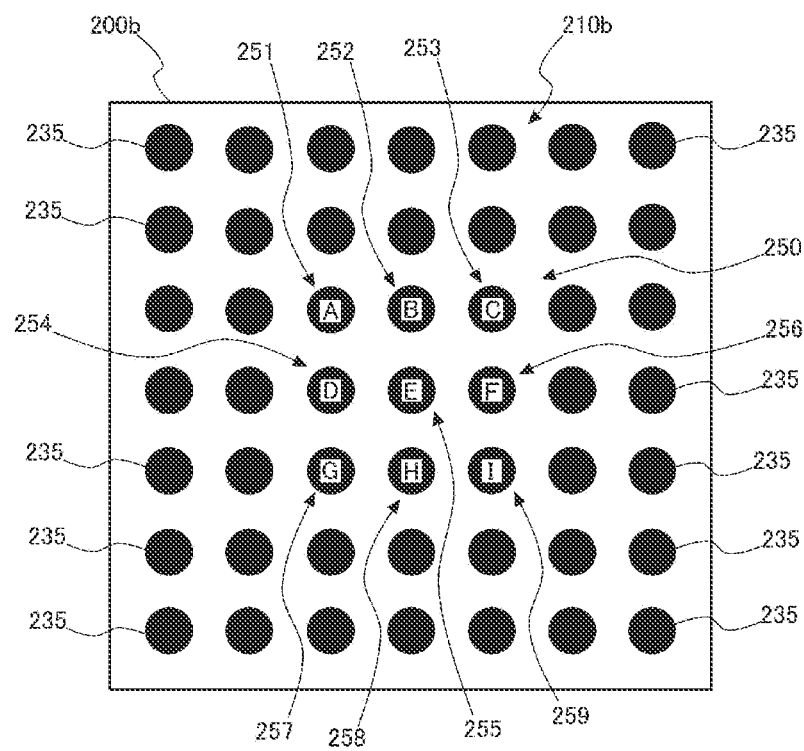
FIG. 13 shows a variation of the pattern image.
Figure 14:
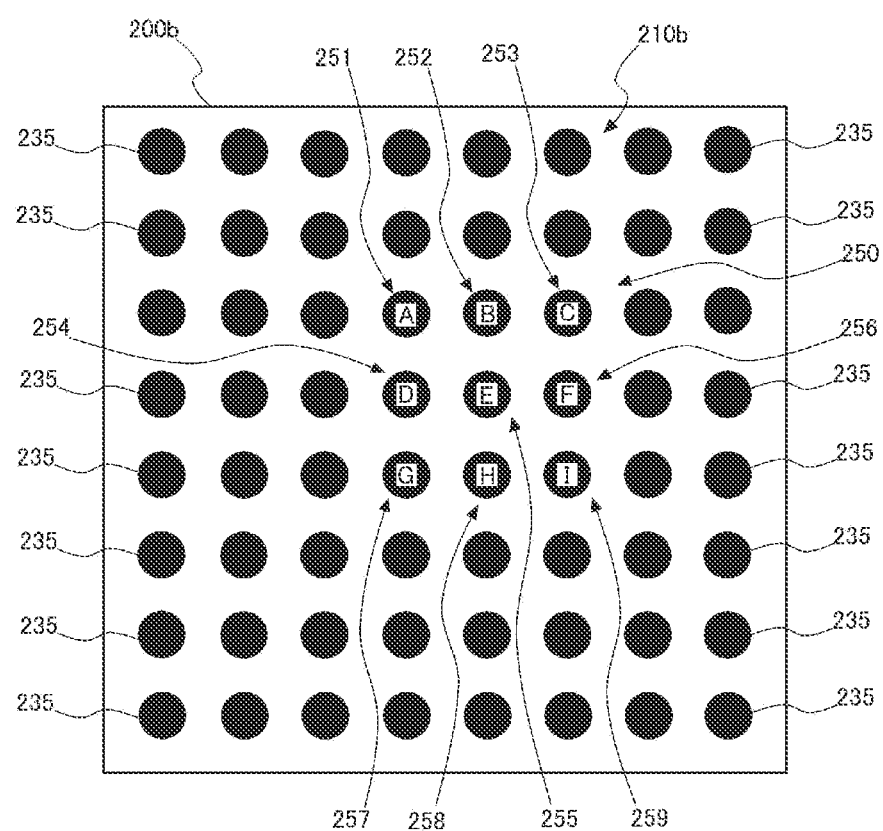
FIG. 14 shows the variation of the pattern image.

FIGS. 13 and 14 show a pattern image 200b, which is a variation of the pattern image 200a.

The pattern image 200b in the variation has a dot pattern 210b. The number of detection dots 250 placed in the dot pattern 210b is greater than the number of detection dots 230 placed in the dot pattern 210a. The detection dots 250 are formed of nine dots, a dot A 251, a dot B 252, a dot C 253, a dot C 254, a dot B 255, a dot F 256, a dot G 257, a dot H 258, and a dot I 259. The detection dots 250 have a configuration in which nine dots are arranged in a matrix formed of three vertically arranged rows and three horizontally arranged columns. The dot A 251 corresponds to the first dot 231 in the dot pattern 210a.

FIGS. 13 and 14 show a case where the centers of the dots that form the detection dots 250 are marked with alphabetical letters, "A", "B", "C", "D", "E", "F", "G", "H", and "I" to identify the dots. The letters used for the dot identification are not limited to the alphabetical letters and may instead be numerals or letters of any other language.

The number of dots that form the detection dots 250 is increased from four to nine. Therefore, when part of the detection dots 250 cannot be detected, the remainder of the detection dots 250 can be used to identify the position of each of the dots in the dot pattern 210b.

The variation will be described with reference to the case where the detection dots 250 have nine dots arranged in a matrix formed of three rows and three columns, and the number of detection dots 250 only needs to be at least four.

In the two-dimensional coordinate system showing positions in the pattern image 200b, when the origin is located at the upper left corner, the dot A 251, the dot B 252, and the dot C 253 are placed in the same row of the dot pattern 210b.

The dot D 254, the dot E 255, and the dot F 256 are placed in the same crow of the dot pattern 210b, the row shifted by one row downward from the dot A 251, the dot B 252, and the dot C 253.

The dot G 257, the dot H 258, and the dot I 259 are placed in the same row of the dot pattern 210b, the row shifted by two rows downward from the dot A 251, the dot B 252, and the dot C 253.

The dot A 251, the dot D 254, and the dot G 257 are placed in the same row of the dot pattern 210b.

The dot B 252, the dot E 255, and the dot H 258 are placed in the same column of the dot pattern 210b, the column shifted by one column rightward from the dot A 251, the dot C 254, and the dot G 257.

The dot C 253, the dot F 256, and the dot I 259 are placed in the same column of the dot pattern 210b, the column shifted by two columns rightward from the dot A 251, the dot D 254, and the dot G 257.

FIG. 13 shows a case where the dot pattern 210b has N rows and M columns, where N and M are each an odd number.

When M and N, which are the numbers of rows and columns that form the dot pattern 210b, are each an odd number. The dots are so placed that the dot E 255 is located at the center of the dot pattern 210b.

When the dot pattern 210b has seven rows and seven columns shown in FIG. 13, the dot E 255 is placed at the position of the fourth dot counted from each of the left side 201, the right side 203, the upper side 205, and the lower side 207.

FIG. 14 shows a case where the dot pattern 210b has N rows and M columns, where N and M are each an even number.

In the dot pattern 210b having eight rows and eight columns shown in FIG. 14, the dot D 254, the dot E 255, and the dot F 256, which form the second row of the detection dots 250, are placed in the fourth or fifth row counted from the upper side 205 of the dot pattern 210b. That is, the second row of the detection dots 250 is placed in the M/2-th or {(M/2)+1}-th row counted from the upper side of the dot pattern 210b. FIG. 14 shows a case where the dot D 254, the dot F 255, and the dot F 256 are placed in the fourth row counted from the upper side of the dot pattern 210b.

In the dot pattern 210b having eight rows and eight columns shown in FIG. 14, the dot B 252, the dot E 255, and the dot H 258, which form the second column of the detection dots 250, are placed in the fourth or fifth column counted from the left side of the dot pattern 210b. That is, the second column of the detection dots 250 is placed in the M/2-th or {(M/2)+1}-th column counted from the left side of the dot pattern 210b. FIG. 14 shows a case where the dot B 252, the dot E 255, and the dot H 258 are placed in the fifth column counted from the left side of the dot pattern 210b.

4. Action of Projector

Figure 15:
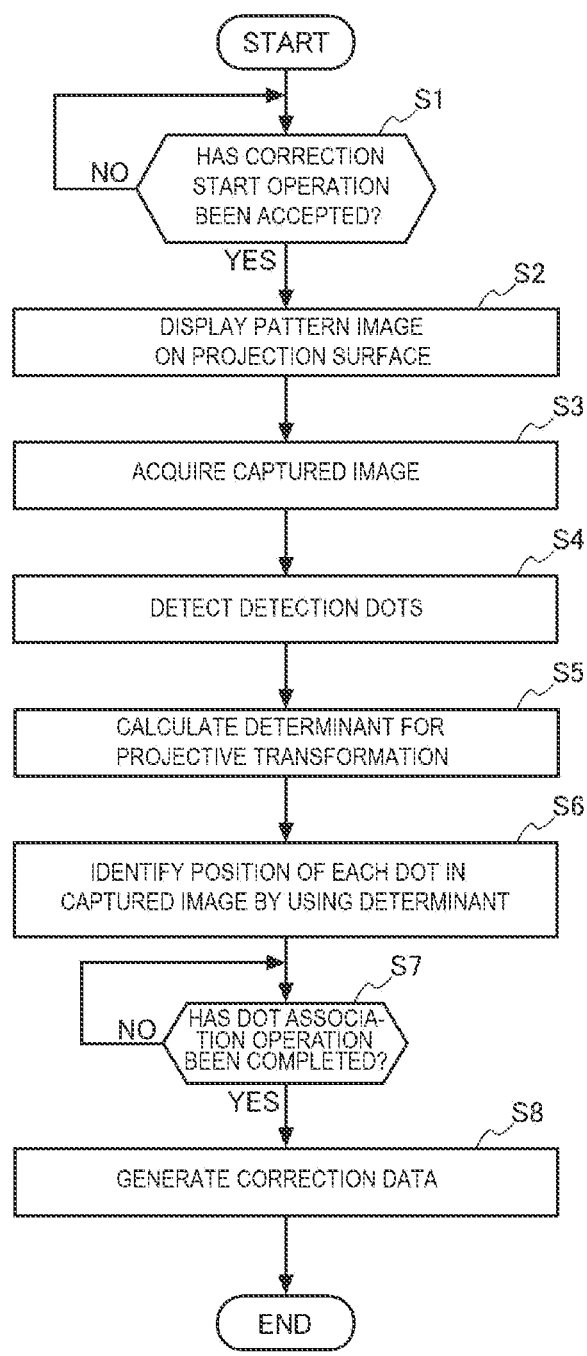
FIG. 15 is a flowchart showing the action of the projector.

FIG. 15 is a flowchart showing the action of the projector 1.

The action of the projector 1 will be described with reference to FIG. 15.

The controller 60 evaluates whether or not correction start operation has been accepted (step S1). When the correction start operation has not been accepted (NO in step S1), the controller 60 waits until the correction start operation is accepted.

When the correction start operation has been accepted (YES in step S1), the controller 60 first causes the projection unit 50 to display the pattern image 200a on the projection surface 7 (step S2). The controller 60 then causes the imager 30 to perform the imaging to acquire captured images (step S3). The imager 30 performs the imaging in response to the instruction from the controller 60 and outputs the captured images generated by the imaging to the controller 60. The controller 60 causes the storage 70 to store the inputted captured images.

The controller 60 then performs image analysis on the captured image to detect the detection dots 230 contained in the captured image (step S4). Upon detection of the detection dots 230, the controller 60 calculates a determinant for projective transformation (step S5). The calculated determinant is a determinant that converts the positions of the first dot 231, the second dot 232, the third dot 233, and the fourth dot 234 in the pattern image 200a into the positions of the first dot 231, the second dot 232, the third dot 233, and the fourth dot 234 in the captured image.

The controller 60 then performs a projective transformation of the position of each of the dots contained in the pattern image 200a by using the calculated determinant for projective transformation, and identifies the dots in in the captured image based on the positions having undergone the projective transformation (step S6).

The controller 60 then evaluates whether or not all the dots in the pattern image 200a have been associated with the dots in the captured image (step S7). When there is a dot in the pattern image 200a that has not associated with a dot in the captured image (NO in step S7), the controller 60 returns to the process in step S6.

When the dot association operation is completed (YES in step S7), the controller 60 generates correction data for correction of the displayed image based on the positions of the dots in the pattern image 200a and the positions of the dots in the captured image that have been associated with each other (step S8). When the generation of the correction data is completed, the controller 60 terminates the entire process procedure.

5. Effects of Projection Method

The controller 60 of the projector 1 according to the present embodiment includes causing the projection unit 50 to project the pattern image 200a containing the dot pattern 210a, and acquiring a captured image as a result of capture of an image of the projected pattern image 200a. The controller 60 further associates the dots of the dot pattern 210a contained in the captured image with the dots of the dot pattern 210a contained in the pattern image 200a.

The dot pattern 210a contains the first dot 231, the second dot 232, the third dot 233, the fourth dot 234, and the black dots 235.

As the display mode of the first dot 231, the first dot 231 is displayed red, which is a first display mode. As the display mode of the second dot 232, the second dot 232 is displayed blue, which is a second display mode different from the first display mode. As the display mode of the third dot 233, the third dot 233 is displayed green, which is a third display mode different from the first and second display modes. As the display mode of the fourth dot 234, the fourth dot 234 is displayed white against a black background, which is a fourth display, mode different from the first, second, and third display modes. As the display mode of the black dots 235, the black dots 235 are displayed black, which is a fifth display mode different from the first, second, third, and fourth display modes.

The first dot 231 is adjacent to the second dot 232 in the horizontal direction, which is the first direction, and also adjacent to the third dot 233 in the vertical direction, which is the second direction perpendicular to the first direction.

The second dot 232 is adjacent to the fourth dot 234 in the vertical direction, which is the second direction. The third dot 233 is adjacent to the fourth dot 234 in the horizontal direction, which is the first direction.

According to the configuration described above, when the projection surface 7, on which the projector 1 projects the pattern image 200a, has protrusions and recesses, the closer a protrusion and a recess adjacent to each other are, the smaller the change in the difference between the protrusion and recess is, whereby the accuracy of the detection of the first dot 231, the second dot 232, the third dot 233, and the fourth dot 234 can be improved.

The configuration in which the first dot 231, the second dot 232, the third dot 233, and the fourth dot 234 are displayed in different modes allows improvement in the accuracy of the detection of the dots.

The rows of the dot pattern 210a each have M dots arranged in the horizontal direction. When M is an even number, the horizontal position of the first dot 231 is the M/2-th position counted from the dot that constitutes one ends of the dot pattern 210a arranged in the horizontal direction and is located at one of the ends in the horizontal direction.

When M is an odd number, the horizontal position of the first dot 231 is the (M+1)/2-th position counted from the dot that constitutes one ends of the dot pattern 210a arranged in the horizontal direction and is located at one of the ends in the horizontal direction. M is an integer greater than or equal to three.

According to the configuration described above, the first dot 231, the second dot 232, the third dot 233, and the fourth dot 234 are placed substantially at the horizontal center of the pattern image 200a. Therefore, even when there is a problem with the projector installation, for example, when the projector 1 does not squarely face the projection surface 7, the first dot 231, the second dot 232, the third dot 233, and the fourth dot 234 can be displayed on the projection surface 7. The frequency of problems, such as an undetectable first dot 231, second dot 232, third dot 233, and fourth dot 234, can therefore be reduced. In addition, based, for example, on the position of the center of gravity of the entire dots detected in the captured image, the area where the first dot 231, the second dot 232, the third dot 233, and the fourth dot 234 are located can be narrowed down.

The columns of the dot pattern 210a each have N dots arranged in the vertical direction. When N is an even number, the vertical position of the first dot 231 is the N/2-th position counted from the dot that constitutes one ends of the dot pattern 210a arranged in the vertical direction and is located at one of the ends in the vertical direction.

When N is an odd number, the vertical position of the first dot 231 is the (N+1)/2-th position counted from the dot that constitutes one ends of the dot pattern 210a arranged in the vertical direction and is located at one of the ends in the vertical direction. N is an integer greater than or equal to three.

According to the configuration described above, the first dot 231, the second dot 232, the third dot 233, and the fourth dot 234 are placed substantially at the vertical center of the pattern image 200a. Therefore, even when there is a problem with the projector installation, for example, when the projector 1 does not squarely face the projection surface 7, the first dot 231, the second dot 232, the third dot 233, and the fourth dot 234 can be displayed on the projection surface 7. The frequency of problems, such as an undetectable first dot 231, second dot 232, third dot 233, and fourth dot 234, can therefore be reduced. In addition, based, for example, on the position of the center of gravity of the entire dots detected in the captured image, the area where the first dot 231, the second dot 232, the third dot 233, and the fourth dot 234 are located can be narrowed down.

The first dot 231 is located substantially the center of the pattern image 200a.

According to the configuration described above, the first dot 231, the second dot 232, the third dot 233, and the fourth dot 234 are placed substantially at the center of the pattern image 200a. Therefore, even when there is a problem with the projector installation, for example, when the projector 1 does not squarely face the projection surface 7, the first dot 231, the second dot 232, the third dot 233, and the fourth dot 234 can be displayed on the projection surface 7. The frequency of problems, such as an undetectable first dot 231, second dot 232, third dot 233, and fourth dot 234, can therefore be reduced. In addition, based, for example, on the position of the center of gravity of the entire dots detected in the captured image, the area where the first dot 231, the second dot 232, the third dot 233, and the fourth dot 234 are located can be narrowed down.

The difference between the first number of dots, which is the number of dots from the left side 201 of the pattern image 200a to the first dot 231, and the second number of dots, which is the number of dots from the right side 203 of the pattern image 200a, which faces the left side 201 in the horizontal direction, to the first dot 231, is smaller than the difference between the third number of dots, which is the number of dots from the left side 201 to a black dot 235 placed in the column where the first dot 231 is placed, and the fourth number of dots, which is the number of dots from the right side 203 to the black dot 235.

According to the configuration described above, the first dot 231 is placed at a position shifted from the black dots 235 toward the center in the horizontal direction of the pattern image 200a. Therefore, even when there is a problem with the projector installation, for example, when the projector 1 does not squarely face the projection surface 7, the first dot 231, the second dot 232, the third dot 233, and the fourth dot 234 can be displayed on the projection surface 7.

The frequency of problems, such as an undetectable first dot 231, second dot 232, third dot 233, and fourth dot 234, can therefore be reduced.

The difference between the fifth number of dots, which is the number of dots from the upper side 205 of the pattern image 200a to the first dot 231, and the sixth number of dots, which is the number of dots from the lower side 207 of the pattern image 200a to the first dot 231, is smaller than the difference between the seventh number of dots, which is the number of dots from the upper side 205 to a black dot 235 placed in the row where the first dot 231 is placed, and the eighth number of dots, which is the number of dots from the lower side 207 to the black dot 235.

According to the configuration described above, the first dot 231 is placed at a position shifted from the black dots 235 toward the center in the vertical direction of the pattern image 200a. Therefore, even when there is a problem with the projector installation, for example, when the projector 1 does not squarely face the projection surface 7, the first dot 231, the second dot 232, the third dot 233, and the fourth dot 234 can be displayed on the projection surface 7. The frequency of problems, such as an undetectable first dot 231, second dot 232, third dot 233, and fourth dot 234, can therefore be reduced.

The dots contained in the dot pattern 210a include one or more dots in addition to the first dot 231, the second dot 232, the third dot 233, the fourth dot 234, and the black dots 235. The display mode of the one or more dots is the fifth display mode.

According to the configuration described above, one or more dots are provided besides the first dot 231, the second dot 232, the third dot 233, the fourth dot 234, and the black dots 235, and the display mode of the one or more dots is the fifth display mode, whereby the accuracy of the detection of the first dot 231, the second dot 232, the third dot 233, and the fourth dot 234 can be increased.

6. Effects of Configuration of Projector

The projector 1 includes the projection unit 50, which projects the pattern image 200a containing the dot pattern 210a, the imager 30, which captures an image of the pattern image 200a projected by the projection unit 50, and the controller 60, which associates the dots of the dot pattern 210a contained in the captured image captured by the imager with the dots of the dot pattern 210a contained in the pattern image 200a.

The dot pattern 210a contains the first dot 231, the second dot 232, the third dot 233, the fourth dot 234, and the black dots 235.

As the display mode of the first dot 231, the first dot 231 is displayed red, which is the first display mode. As the display mode of the second dot 232, the second dot 232 is displayed blue, which is the second display mode different from the first display mode. As the display mode of the third dot 233, the third dot 233 is displayed green, which is the third display mode different from the first and second display modes. As the display mode of the fourth dot 234, the fourth dot 234 is displayed white against a black background, which is the fourth display mode different from the first, second, and third display modes. As the display mode of the black dots 235, the black dots 235 are displayed black, which is the fifth display mode different from the first, second, third, and fourth display modes.

The first dot 231 is adjacent to the second dot 232 in the horizontal direction, which is the first direction, and also adjacent to the third dot 233 in the vertical direction, which is the second direction perpendicular to the first direction.

The second dot 232 is adjacent to the fourth dot 234 in the vertical direction, which is the second direction. The third dot 233 is adjacent to the fourth dot 234 in the horizontal direction, which is the first direction.

According to the configuration described above, when the projection surface 7, on which the projector 1 projects the pattern image 200a, has protrusions and recesses, the closer a protrusion and a recess adjacent to each other are, the smaller the change in the difference between the protrusion and recess is, whereby the accuracy of the detection of the first dot 231, the second dot 232, the third dot 233, and the fourth dot 234 can be improved.

The configuration in which the first dot 231, the second dot 232, the third dot 233, and the fourth dot 234 are displayed in different modes allows improvement in the accuracy of the detection of the dots.

The embodiment and the variations thereof described above are each a preferable embodiment of the present disclosure. The present disclosure is, however, not limited to the embodiment and the variations thereof described above, and a variety of variations can be conceivable to the extent that the variations do not depart from the substance of the present disclosure.

For example, the process units in the flowchart shown in FIG. 15 are process units divided in accordance with the contents of primary processes for easy understanding of the entire process carried out by the projector 1. How to divide the entire process into the process units or the names of the process units shown in the flowchart in FIG. 15 do not limit the present disclosure. The entire process carried out by the projector 1 can be divided into a larger number of process units, or can be so divided that one process unit includes a larger number of processes in accordance with the content of the process. Furthermore, the order in which the processes are carried out in the flowchart described above is not limited to that shown in FIG. 15.

The functional portions of the projectors 1 shown in FIG. 1 each represent a functional configuration achieved by cooperation between hardware and software and are each not necessarily implemented a specific form. Therefore, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware in the embodiment described above may be achieved by software.

In a case where the projection method according to the present disclosure is achieved by a computer incorporated in the projector 1, a program executed by the computer can be configured in the form of a recording medium. The program executed by the computer can instead be configured in the form of a transmission medium via which the program is transmitted. The recording medium can be a magnetic or optical recording medium or a semiconductor memory device. Specific examples of the recording medium may include a portable or immobile recording medium such as a flexible disk, an HDD, a CD-ROM (compact disk read only memory), a DVD (digital versatile disc), a Blu-ray disc, a magneto-optical disk, a flash memory, and a card-shaped recording medium. The recording medium described above may instead be a RAM, a ROM, an HDD, or any other nonvolatile storage device that is an internal storage device provided in a server apparatus. Blu-ray is a registered trademark.

The embodiment described above has been presented with reference to the configuration in which the projector 1 includes the imager 30, which captures an image of the pattern image 200a, but not necessarily. The projector 1 may not include the imager 30, but a camera separate from the projector 1 may be used to generate a captured image as a result of capture of an image of the pattern image 200a. In this case, the captured image generated by the camera may be transmitted to the controller 60 via the communication I/F 20 provided in the projector 1.

What is claimed is:

1. A projection method comprising:
    causing a projector to project a first image containing a dot pattern;
    acquiring a captured image as a result of capture of an image of the projected first image; and
    associating dots of the dot pattern contained in the captured image with dots of the dot pattern contained in the first image,
    wherein the dot pattern contains a first dot, a second dot, a third dot, a fourth dot, and a fifth dot,
    a display mode of the first dot is a first display mode,
    a display mode of the second dot is a second display mode different from the first display mode,
    a display mode of the third dot is a third display mode different from the first and second display modes,
    a display mode of the fourth dot is a fourth display mode different from the first, second, and third display modes,
    a display mode of the fifth dot is a fifth display mode different from the first, second, third, and fourth display modes,
    the first dot is located substantially at a center of the first image and is adjacent to the second dot in a first direction, and also adjacent to the third dot in a second direction perpendicular to the first direction,
    the second dot is adjacent to the fourth dot in the second direction, and
    the third dot is adjacent to the fourth dot in the first direction.

2. The projection method according to claim 1,
    wherein each line of the dot pattern extending in the first direction has M dots arranged in the first direction,
    a position of the first dot in the first direction when M is an even number is an M/2-th position counted from a dot constituting one of ends of the dot pattern in the first direction,
    a position of the first dot in the first direction when M is an odd number is an (M+1)/2-th position counted from the dot constituting one of ends of the dot pattern in the first direction, and
    M is an integer greater than or equal to three.

3. The projection method according to claim 1,
    wherein each line of the dot pattern extending in the second direction has N dots arranged in the second direction,
    a position of the first dot in the second direction when N is an even number is an N/2-th position counted from a dot constituting one of ends of the dot pattern in the second direction,
    a position of the first dot in the second direction when N is an odd number is an (N+1)/2-th position counted from the dot constituting one of ends of the dot pattern in the second direction, and
    N is an integer greater than or equal to three.

4. The projection method according to claim 1, wherein a difference between a first number of dots and a second number of dots is smaller than a difference between a third number of dots and a fourth number of dots, the first number of dots being the number of dots from a first side of the first image to the first dot, the second number of dots being the number of dots from a second side of the first image that is a side facing the first side in the first direction to the first dot, the third number of dots being the number of dots from the first side to the fifth dot placed in a row where the first dot is placed, and the fourth number of dots being the number of dots from the second side to the fifth dot.

5. The projection method according to claim 1, wherein a difference between a fifth number of dots and a sixth number of dots is smaller than a difference between a seventh number of dots and an eighth number of dots, the fifth number of dots being the number of dots from a third side of the first image to the first dot, the sixth number of dots being the number of dots from a fourth side of the first image that is a side facing the third side in the second direction to the first dot, the seventh number of dots being the number of dots from the third side to the fifth dot placed in a column where the first dot is placed, and the eighth number of dots being the number of dots from the fourth side to the fifth dot.

6. The projection method according to claim 1,
    wherein the dot pattern further contains one or more dots in addition to the first dot, the second dot, the third dot, the fourth dot, and the fifth dot, and
    a display mode of the one or more dots is the fifth display mode.

7. The projection method according to claim 1, wherein the dots of the dot pattern other than the first, the second, the third and the fourth dot comprise fifth dots constituted by the fifth dot which are displayed in the same display mode of each other.

8. A projector comprising:
    a projection lens that projects a first image containing a dot pattern;
    a camera that captures an image of the first image projected via the projection lens; and
    a processor that associates dots of the dot pattern contained in a captured image captured by the camera with dots of the dot pattern contained in the first image,
    wherein the dot pattern contains a first dot, a second dot, a third dot, a fourth dot, and a fifth dot,
    a display mode of the first dot is a first display mode,
    a display mode of the second dot is a second display mode different from the first display mode,
    a display mode of the third dot is a third display mode different from the first and second display modes,
    a display mode of the fourth dot is a fourth display mode different from the first, second, and third display modes,
    a display mode of the fifth dot is a fifth display mode different from the first, second, third, and fourth display modes,
    the first dot is located substantially at a center of the first image and is adjacent to the second dot in a first direction, and also adjacent to the third dot in a second direction perpendicular to the first direction,
    the second dot is adjacent to the fourth dot in the second direction, and
    the third dot is adjacent to the fourth dot in the first direction.

9. The projector according to claim 8,
    wherein each line of the dot pattern extending in the first direction has M dots arranged in the first direction, a position of the first dot in the first direction when M is an even number is an M/2-th position counted from a dot constituting one of ends of the dot pattern in the first direction, a position of the first dot in the first direction when M is an odd number is an (M+1)/2-th position counted from the dot constituting one of ends of the dot pattern in the first direction, and M is an integer greater than or equal to three.

10. The projector according to claim 8, wherein each line of the dot pattern extending in the second direction has N dots arranged in the second direction, a position of the first dot in the second direction when N is an even number is an N/2-th position counted from a dot constituting one of ends of the dot pattern in the second direction, a position of the first dot in the second direction when N is an odd number is an (N+1)/2-th position counted from the dot constituting one of ends of the dot pattern in the second direction, and N is an integer greater than or equal to three.

11. The projector according to claim 8, wherein a difference between a first number of dots and a second number of dots is smaller than a difference between a third number of dots and a fourth number of dots, the first number of dots being the number of dots from a first side of the first image to the first dot, the second number of dots being the number of dots from a second side of the first image that is a side facing the first side in the first direction to the first dot, the third number of dots being the number of dots from the first side to the fifth dot placed in a row where the first dot is placed, and the fourth number of dots being the number of dots from the second side to the fifth dot.

12. The projector according to claim 8, wherein a difference between a fifth number of dots and a sixth number of dots is smaller than a difference between a seventh number of dots and an eighth number of dots, the fifth number of dots being the number of dots from a third side of the first image to the first dot, the sixth number of dots being the number of dots from a fourth side of the first image that is a side facing the third side in the second direction to the first dot, the seventh number of dots being the number of dots from the third side to the fifth dot placed in a column where the first dot is placed, and the eighth number of dots being the number of dots from the fourth side to the fifth dot.

13. The projector according to claim 8, wherein the dot pattern further contains one or more dots in addition to the first dot, the second dot, the third dot, the fourth dot, and the fifth dot, and a display mode of the one or more dots is the fifth display mode.

14. The projector according to claim 8, wherein the dots of the dot pattern other than the first, the second, the third and the fourth dot comprise fifth dots constituted by the fifth dot which are displayed in the same display mode of each other.

* * * * *